G. T. BRAZELTON.
AUTOMOBILE LAMP ATTACHMENT.
APPLICATION FILED NOV. 29, 1912.
1,086,436.
Patented Feb. 10, 1914.
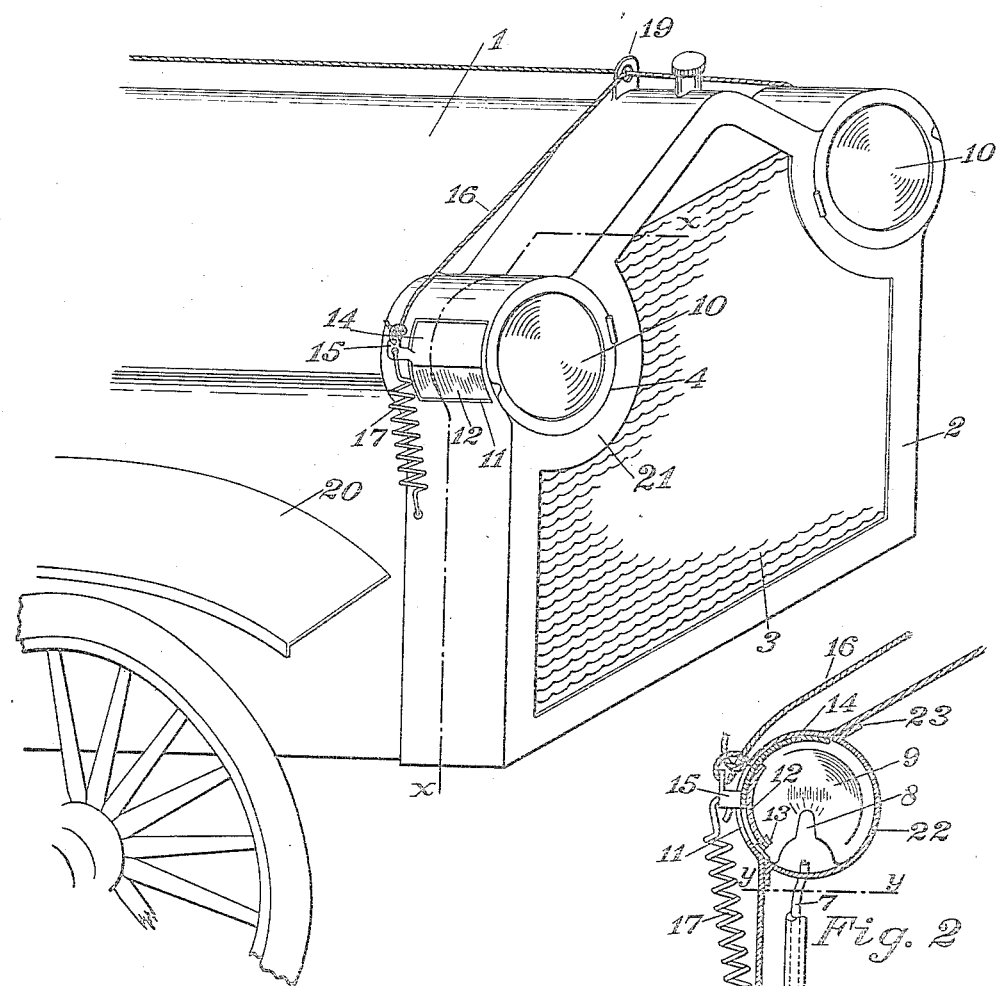
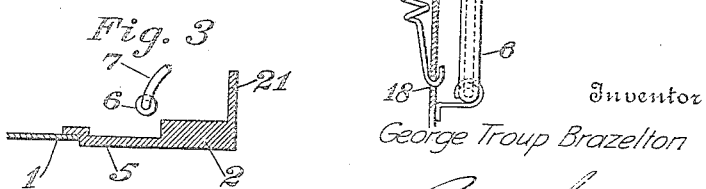
Inventor
George Troup Brazelton

UNITED STATES PATENT OFFICE.

GEORGE TROUP BRAZELTON, OF BIRMINGHAM, ALABAMA.

AUTOMOBILE LAMP ATTACHMENT.

1,086,436.  Specification of Letters Patent.  Patented Feb. 10, 1914.

Application filed November 29, 1912. Serial No. 734,164.

*To all whom it may concern:*

Be it known that I, GEORGE TROUP BRAZELTON, a citizen of the United States of America, residing at Birmingham, in the county of Jefferson and State of Alabama, have invented certain new and useful Improvements in Automobile Lamp Attachments, of which the following is a specification.

My invention relates to a new and useful improvement in the manner of attaching lamps to automobiles and relates particularly to an arrangement whereby the large front lamps can be mounted in the radiator frame or formed as a part thereof.

In the present practice the large front lamps are mounted on brackets and project in front of the radiator at each side where they are most liable to injury. The serious jolting and jarring which such lamps receive cause them to work loose and rattle. The lamps are also set low so that the wheel fenders on either side would interfere with any arrangement for projecting rays of light to the side which is often desirable in searching for turn out roads or road signs.

The objects of my invention are to simplify the manner of mounting the lamps by designing the radiator so that the lamps are set in the same and are therefore very largely protected from casual injury. By designing the forward end of the radiator frame to receive the lamp or to form the outer casing of the lamp, the disadvantages resulting from the bracket method of fastening the present large lamps are avoided.

A further object of my invention is to provide the lamps with lateral openings provided with a shield which can be controlled by the driver and raised to throw out light laterally and sufficiently high to clear the fenders.

My invention further comprises the details of construction and arrangement of parts which are hereinafter more particularly described and claimed with reference to the accompanying drawings in which the preferred embodiment only of my invention is illustrated, and in which—

Figure 1 presents a perspective view of an automobile hood and radiator with the lamps built into the radiator. Fig. 2 is a partial vertical sectional detail view taken along the line x—x of Fig. 1. Fig. 3 is a horizontal cross sectional view through the side frame of the radiator along the line y—y of Fig. 2.

Similar reference numerals refer to similar parts throughout the drawings.

The automobile hood 1 has at its front end a radiator comprising a metal frame 2 inclosing any suitable design of radiating elements 3. This frame is provided at each of its upper corners with an integral lamp socket which, in the form illustrated, is a circular casing 4 having its outer wall bulging outwardly to a greater or less extent as may be desired, or the lamp socket may not bulge to any substantial extent. The amount of radiating surface displaced by the lamp sockets may be provided for in any suitable manner in the radiator design. The frame 2 is preferably provided with a rear extension 5 which gives it the necessary width to form the lamp body and also receive a conduit 6 suitably fastened therein and adapted to convey to the lamp the electric cable or gas tube 7 which extends rearwardly in any suitable manner to the source of light. Within the lamp socket is provided any standard type of burner 8 and reflector 9, and the usual glass doors 10 are hinged at the front. I provide a side opening 11 in the outer wall of each lamp and protect the opening by a glass 12 held slightly spaced from the opening 11 by suitable retainers 13. A curved shield 14 is interposed between the glass and opening and is provided with a projecting lug 15 to which a cord 16 is attached from above and to which a coiled spring 17 is attached from below, the lower end of this spring being fastened in an opening 18 in the casing 5. The cords 16 pass through an opening in a guide lug 19 at the top of the radiator frame and extend rearwardly to a position where they can be operated by the driver. It will be noted that the openings 11 stand above the fenders 20.

As illustrated, the outer wall of the lamp body, which may be of any suitable design, is formed as an integral part of the radiator frame 2, the front flange 21 of which passes around under the front end of the lamp. A curved plate 22 may be inserted to form the inner lining of the lamp and its flanged ends 23 may be spot welded to the frame 2. I regard this as the preferred construction, but a lamp may be inserted and detachably fastened in a socket as thus provided in the radiator and the advantages of the manner of mounting may be largely obtained even where the radiator frame is formed with a curved socket open at the side or above to receive the lamp or lamp parts.

It will be noted that the opening 11 extends forward sufficiently to cause the rays of light which are reflected therethrough by the reflecting means in the lamp and also the direct rays from the burner 8, to practically blend with the rays of light passing through the front lens 10, giving a wide sweep to the light and effectually covering each side of the road, making it easy to locate the turn offs and to read the signs and directions without stopping the car. The springs 17 will automatically draw the shields 14 down and close the side light apertures 11 when the driver releases the cord 16. By setting the lights thus firmly in the radiator or in the forward end of the hood, particular advantage is gained where electric lights are used in that it materially reduces the vibration to which the incandescent filament is subjected.

When the radiator is designed with a view to receive lamps in the manner described, its cost will be very little in excess of the present construction and in this way I reduce not only the cost of maintenance of the lamps but also the original cost and I provide a construction which will meet every lighting requirement of the automobile drivers and require a minimum of attention and up-keep expense.

Having thus described my invention, what I claim as new and desire to secure by Letters Patent, is:—

1. The combination with an automobile radiator, of lamps carried thereby at its upper corners and disposed above the adjacent mud guards, said lamps having glass covered front and side openings, vertically sliding doors to close said side openings, and an operating connection leading from said doors to the center of the top of the radiator and rearwardly along the radiator to the car, substantially as described.

2. The combination with an automobile radiator, of lamps carried thereby at its upper corners and disposed above the adjacent mud guards, said lamps having glass covered front and side openings, vertically sliding doors to close said side openings, an operating connection leading from said doors to the center of the top of the radiator and rearwardly along the radiator to the car, and spring means to hold said doors normally in position to close said side openings.

3. An automobile radiator comprising a marginal frame which at its upper corners is shaped to form lamp pockets having glass covered side and front openings, a curved slide disposed within the correspondingly curved wall of the radiator frame which forms the side of the lamp pocket, said slide having a projection, spring means engaging it and tending to hold the slide closed over the side opening, and an operating connection connected to said projection and extending inwardly over the radiator frame to the center thereof and rearwardly and centrally over the radiator to the car.

4. A radiator comprising a metallic frame-work consisting of marginal front and side plates, the side plates being struck on a convex curve at the upper corners and the front plates being struck on a concave curve, a curved metal piece attached inside the upper corners of the side plates and forming with the convex portions thereof rounded lamp pockets, a burner therein, and a door containing the front lamp lens hinged to the radiator and closing said forward end of each pocket, substantially as described.

In testimony whereof I affix my signature in presence of two witnesses.

GEORGE TROUP BRAZELTON.

Witnesses:
 NOMIE WELSH,
 R. D. JOHNSTON.